UNITED STATES PATENT OFFICE.

FREDERICK M. BECKET, OF NIAGARA FALLS, NEW YORK, ASSIGNOR TO ELECTRO METALLURGICAL COMPANY, OF NEW YORK, N. Y., A CORPORATION OF WEST VIRGINIA.

METHOD OF PREPARING PIGMENTS.

976,337.  Specification of Letters Patent.  Patented Nov. 22, 1910.

No Drawing.  Application filed September 18, 1908. Serial No. 453,587.

*To all whom it may concern:*

Be it known that I, FREDERICK M. BECKET, a citizen of the United States, residing at Niagara Falls, in the county of Niagara and State of New York, have invented certain new and useful Improvements in Methods of Preparing Pigments, of which the following is a specification.

The object of this invention is to provide a method of preparing highly refractory pigments which may exhibit brilliant and relatively permanent color effects.

According to the invention a refractory metallic body is first comminuted to the degree of fineness desired for the pigment, and is thereafter subjected to heat and to the action of a gaseous medium for developing the color, the temperature and the gas supply being regulated to control the color of the product.

It is frequently observed that the surfaces of fracture of certain refractory metallic products present areas which are highly and usually very irregularly colored, this effect being more particularly noted in the case of pigs or ingots of the metal or alloy which have been broken while still at a comparatively high temperature and permitted to cool in contact with air. Thus if titanium carbid be fractured at a high temperature and exposed to air during cooling the fractured surfaces will often be found to exhibit brilliant color effects wherein yellow, green, blue or red may predominate in accordance with the conditions, all of these colors being usually presented in irregular areas. The same effect may be secured by heating in air a block or fragment of the same material. Similar effects, with varying colors, are exhibited by other refractory metallic products, and notably by alloys containing iron, chromium and silicon or iron, manganese and silicon. To some extent the effect is also characteristic of ferro-manganese.

I have discovered that if metallic products of the character of those above described be first comminuted to a degree of fineness rendering them suitable for use as pigments and thereafter subjected under carefully regulated temperature conditions to certain gaseous media, notably nitrogen, oxygen, atmospheric air or the like, brilliant, permanent and approximately uniform colors may be developed; and that very durable pigments may be thus prepared. For instance if titanium carbid or other metallic product high in titanium be heated in air or other gaseous media, brilliant yellow pigments may be prepared, the color being presumably due to a nitrid of the metal. In such case the effect is not masked by the presence of carbon even in the proportion required to form the carbid TiC. The same compound, carefully ignited in air or oxidizing media, may yield blue, green, or red pigments of substantially uniform character and remarkable brilliance and permanence.

The pigments may be prepared by spreading the comminuted metallic product in a comparatively thin layer over which a current of heated gas is led; or the powder may be heated independently while subjected to the action of the gas. In any case the temperature and composition of the gas must be carefully controlled to secure the desired product. In order to obtain pigments of substantially uniform color it is desirable that the powder should be more or less continuously agitated while exposed to the action of the gas, and this may be effected by any desired means, as for instance by conducting the operation in rotary vessels, tubes or drums, or in vessels provided with agitating devices, heat being imparted to the powder either from the gas current or otherwise.

I claim:

1. The method of preparing pigments from refractory bodies, which consists in first comminuting to the degree of fineness required for the pigment a refractory body capable of developing a color when heated in contact with a gas, and then heating the comminuted body in presence of the gas, and regulating the temperature and gas supply to control the color of the pigment.

2. The method of preparing pigments from refractory bodies, which consists in first comminuting to the degree of fineness required for the pigment a refractory body capable of developing a color when heated in contact with a gas, agitating the comminuted body, and heating the same in presence of the gas to develop the color.

In testimony whereof, I affix my signature in presence of two witnesses.

FREDERICK M. BECKET.

Witnesses:
   J. N. DEINHARDT,
   DEAN BURGESS.